United States Patent [19]

Jenner

[11] 4,028,763

[45] June 14, 1977

[54] TAP HOLDER

[76] Inventor: Al Jenner, 222 Grand Canyon Parkway, Hoffman Estates, Ill. 60172

[22] Filed: Sept. 20, 1974

[21] Appl. No.: 507,730

[52] U.S. Cl. .......................... 10/135 R; 10/141 H; 408/132; 408/140

[51] Int. Cl.² ...................... B23G 1/16; B23G 5/16

[58] Field of Search ............... 10/89 F, 129 R, 134, 10/135 R, 141 H; 408/129, 139, 239, 240, 140, 132

[56] References Cited

UNITED STATES PATENTS

| 357,025 | 2/1887 | Pearn | 408/140 |
|---|---|---|---|
| 2,371,330 | 3/1945 | Irstad | 279/16 |
| 2,606,431 | 8/1952 | Elgin | 308/140 X |
| 3,171,145 | 3/1965 | Benjamin et al. | 10/129 R |
| 3,214,773 | 11/1965 | Benjamin et al. | 10/135 R |
| 3,254,353 | 6/1966 | Johnson | 408/140 |
| 3,397,588 | 8/1968 | Johnson | 408/132 |
| 3,599,260 | 8/1971 | Lesh | 10/141 H |
| 3,717,892 | 2/1973 | Johnson | 10/89 F |
| 3,751,051 | 8/1973 | Schmidt | 10/89 F |

Primary Examiner—E. M. Combs
Attorney, Agent, or Firm—Anthony S. Zummer

[57] ABSTRACT

A tap holder which is particularly adapted for use on a numerical-controlled machine is the subject matter herein. The tap holder includes an elongated shaft, which has a conventional tap collet on one end thereof. A tap holder body is rotatably and axially movably mounted on the shaft. The body is particularly adapted for connection to a tool holder of a numerically-controlled machine. A collar is mounted on the shaft. A pair of balanced springs is mounted on the shaft on opposed sides of the collar. Both springs are connected to the body to allow relative axial movement between the shaft and the body. A limited drive torque assembly drivingly connects the shaft to the body to drive the shaft at a torque which does not exceed a predetermined maximum amount.

1 Claim, 4 Drawing Figures

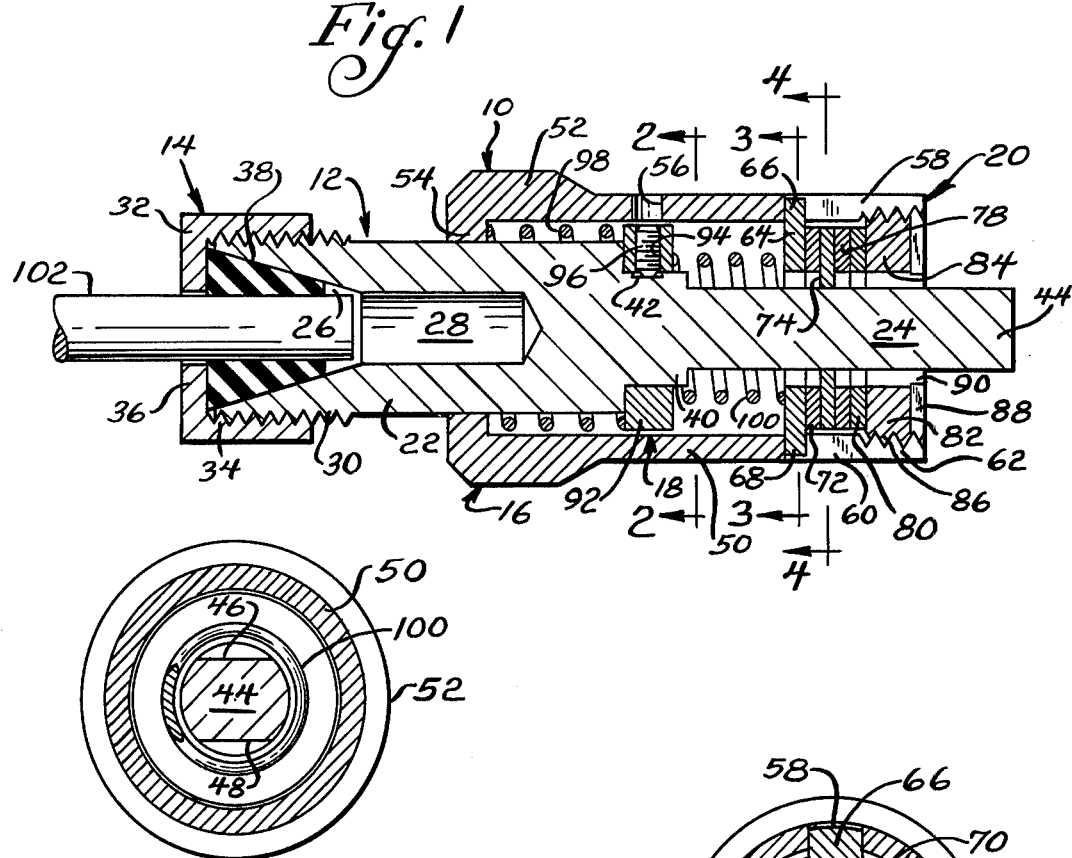
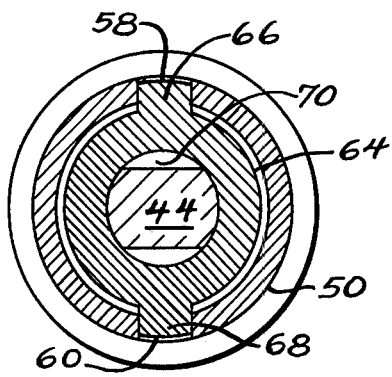
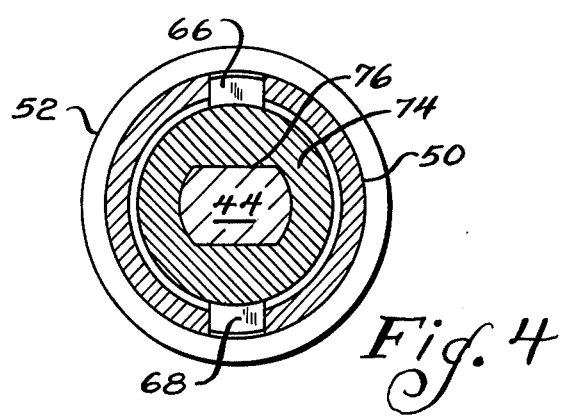

TAP HOLDER

BACKROUND OF THE INVENTION

The use of numerically-controlled machines for repetitive machining operations has gained wide acceptance in American industry. The numerical-controlled machines are programmed to do repetitive functions, which allows for relatively inexpensive manufacture of certain products. One of the problem areas encountered with a numerical-controlled machine is in the area of tapping holes. The speeds and feeds of numerical-controlled machines are generally accurate; but speeds and feeds vary, for many reasons over which there may be no control, such as, line voltage fluctuations in the electrical circuit to the machine. In certain instances, the original input of information to the control device is not entirely accurate, so that there must be allowance for some error.

There are known tap holders which are particularly adapted for use in numerical-controlled machines, which tap holders may make some adjustments and compensations for variations in materials and speeds and feeds. These devices generally are quite cumbersome and quite expensive. The known tap holders are such that they do not readily adapt themselves to automatic tool changes; and, as a result, the efficiency of a numerical-controlled machine is decreased when an operator must be on hand to watch a tapping operation or to make tool changes.

SUMMARY OF THE INVENTION

The present invention relates to a tap holder which is specifically designed for use in a numerical-controlled machine. The tap holder is adapted for holding a variety of sizes of taps; and may be easily mounted in a tool holder of a numerical-controlled machine.

The instant tap holder is one which includes an elongated tap holder shaft, which has a conventional tap collet on one end. The tap collet is adapted for receipt of a variety of sizes of taps. A tap holder body is rotatably mounted on the shaft and may also move axially relative to the shaft. A drive rate compensating assembly is connected to the body and the shaft, which allows the shaft to move axially relative to the body to compensate for variations in speed and feed. A limited drive torque assembly is connected to the shaft and to the body for driving connection between the shaft and the body. The assembly limits the maximum amount of torque which is transmitted to the shaft, thereby limiting the torque transmitted to the tap to reduce the likelihood of tool breakage when the programmed speed is too great or if jamming should occur. It is therefore a principal object of the present invention to provide an improved tap holder for use on a numerical-controlled machine.

It is another object of the present invention to provide a tap holder for use on a numerical-controlled machine, which tap holder is inexpensive to manufacture.

It is a still further object of the herein-disclosed invention to provide a tap holder for use on a numerical-controlled machine, which tap holder allows for variations in speed and feed, and for limiting the amount of torque applied to a tap.

Other objects and uses of this invention will become readily apparent to those skilled in the art upon a perusal of the following specification in light of the accompanying drawing.

BRIEF DESCRIPTION OF THE DRAWING

FIG. 1 is a cross-sectional view of a tap holder embodying the instant invention, with one end of a tap shown mounted in the tap holder;

FIG. 2 is a cross-sectional view taken on Line 2—2 of FIG. 1, showing a portion of a drive rate compensating assembly, which is a part of the present invention;

FIG. 3 is a cross-sectional view taken on Line 3—3 of FIG. 1, showing a body drive plate of the instant tap holder and its connection to a body; and FIG. 4 is a cross-sectional view taken on Line 4—4, showing a shaft drive plate of the present tap holder mounted on a shaft.

DESCRIPTION OF THE PREFERRED EMBODIMENT

Referring now to the drawing, and especially to FIG. 1, a tap holder embodying the present invention is shown therein and generally indicated by numeral 10. The tap holder generally consists of an elongated tap holder shaft 12, having a conventional tap collet 14 on one end. A tap holder body 16 is mounted on the shaft 14. A drive rate compensating assembly 18 is mounted on shaft 12 and is connected to the body. A limited drive torque assembly 20 drivingly connects body 16 to shaft 12.

The shaft 12 is a unitary steel part, which includes a holding portion 22 and a drive portion 24. The holding portion 22 includes a tapered shank aperture 26 at one end and an elongated shank recess 28 opening into the tapered shank aperture. One end of the holding portion 22 of the shaft constitutes a portion of the tap collet 14. An external thread 30 is formed on the end of the shaft. A collet nut 32 is threadly mounted on the thread 30. The collet nut includes a body 34, with a conventional end plate 36. A conventional resilient holding body 38 is positioned in the aperture 26 for engagement with a tap shank.

The drive portion 24 of the shaft includes a collar base 40, with a set screw recess 42 formed therein. A drive tail 44 is formed integral with the collar base 40. The drive tail has a pair of flat sides 46 and 48 to define a non-circular cross-section, generally having the shape of a double-D.

The tap holder body 16 includes a body tube 50, with an integral head 52 on one end and an annular collar 54 for receipt of the holding portion 22 of the shaft. A screw aperture 56 is formed in the tube, for reasons which will become apparent hereinafter. Tube 50 has a pair of drive slots 58 and 60 formed in the other end. An internal thread 62 is formed in the tube 50 adjacent to the slots.

The limited drive torque assembly 20 includes a body drive plate 64, which is flat steel and has a pair of parallel opposed sides. The body drive plate 64 has a pair of integral opposed ears 66 and 68, which ears 66 and 68 are positioned in the slots 58 and 60, respectively, of tube 50. Plate 64 has a circular aperture 70, which freely rotatably receives drive tail 44. A conventional flat brass washer 72 is positioned in contact with the drive plate 64. A shaft drive plate 74 is in frictional engagement with the washer 72. The shaft drive plate is flat steel and has a pair of parallel opposed sides. The drive plate 72 has a double-D aperture 76, which mateably receives the drive tail 44 so that the shaft drive plate 74 and the drive tail 44 rotate together, though the drive tail may move axially relative to the shaft drive plate. The shaft drive plate is free to rotate inside the tube 50. A flat brass washer 78 is mounted in engagement with the drive plate 74. A conventional flat steel washer 80 is positioned in engagement with washer 78.

An end cap 82 is threadedly mounted in tube 50, in engagement with washer 80. The end cap 82 includes a body 84, with external threads 86 mating with threads 62. The end cap contains a slot 88 for receipt of a tool for turning the end cap. The end cap also contains an aperture 90 to receive rotatably drive tail 44.

The drive rate compensating assembly includes an annular spring collar 92, having a set screw aperture 94. A set screw 96 is mounted in aperture 94; and the set screw has its end positioned in the set screw recess 42 to lock the collar to shaft 12. An advancement spring 98 is positioned on the holding portion 22 of shaft 12. The advancement spring is a compression coil spring, having one end abutting the spring collar and the other end abutting the annular collar 54 of the tap holder body. The advancement spring urges the body toward collet 14.

A retardment spring 100 is mounted on the driving portion 24 of the shaft 12. The retardment spring 100 has one end abutting the spring collar 92 and the other end abutting the body drive plate 64. The spring 100 is also a compression coil spring, having a diameter somewhat less than the spring 98. The spring rates of the two springs are identical, so that springs 98 and 100 balance each other. It may be seen that the shaft 12 may reciprocate axially in body 16, while the springs 98 and 100 constantly urge the shaft to a predetermined balanced position.

The tap holder 10 is used simply and conveniently by inserting a tap (such as tap 102) in collet 14. The collet nut 32 is tightened to lock tap 102 into the collet. The tap holder is inserted in a tool holder of a numerical-controlled machine by positioning the body 16 in the tool holder and securing the body 16 in a conventional manner. A specific embodiment of the subject tap holder was built and mounted in an Erickson No. 180 collet chuck adaptor.

The tool holder (which is not shown) rotates the body 16. As body 16 rotates, it carries with it the body drive plate 64. The body drive plate 64 is frictionally connected to the shaft drive plate 74 through the brass washer 72. The frictional force between plate 64 and washer 72, and washer 72 and plate 74, is determined by the normal force between the surfaces. The normal force between the surfaces is determined by how tight end cap 82 is tightened in the tube 50 against washer 80 and the other washers and the drive plate. The force applied by the end cap 82 determines the normal force between the plates and thereby determines the frictional force. The torque applied to the tube is then transmitted to the plate 74, which is non-rotatably mounted on the drive tail 44. The drive tail in turn rotates shaft 12 and collet 14.

It may be appreciated that only a maximum torque is transmitted between the plates 64 and 74. If the speed of the tool holder is too great, so that a very high force is required to turn the tap, there is slippage between the body and the shaft. Also, if there is jamming of some sort (whether because of chips or because of any other reason), the frictional connection between the two drive plates protects the tap.

In the event that the machine is programmed for a feed which is not exactly the feed required for the tap, or if a problem arises (such as jamming) so that there is a slowdown in the speed and the feed continues, the tap holder takes up the variance in the feed. Assuming that the feed is not fast enough for a given speed, the body 16 does not move down toward the work fast enough to keep up with the rate at which the tap 102 is entering the work. The advancement spring 98 is compressed to allow the tap to move forward. On the other hand, should there be jamming or should the tap not rotate fast enough for any other reason and the body 16 is moving toward the work at a rate greater than that at which the tap is moving into the work, the spring 100 is compressed to allow the body to move forward without forcing or breaking the tap 102.

It may be seen that the instant tap holder is simply manufactured and may be easily serviced. As was mentioned above, the maximum torque transmitted by the device is regulated by adjusting the end cap 82. If it is necessary to service the springs 98 and 100 for any reason, it is a simple matter to remove the end cap 82, remove the washers and the drive plates, loosen the set screw 96 through aperture 56, and pull the spring collar 92 off the shaft; and also remove the body 16 from the shaft. The springs may be cleaned, repaired or replaced as needed.

Although a specific embodiment of the present invention has been shown and described in detail above, it is readily apparent that those skilled in the art may make various modifications and changes wthout departing from the spirit and scope of the present invention. It is to be expressly understood that the instant invention is limited only by the appended claims.

I claim:

1. A tap holder particularly adapted for use on a numerical-controlled machine comprising, an elongated tap holder shaft, a tap holder collet on one end of said shaft for releasably holding a tap, the elongated tap holder shaft has an integral non-circular cross-section drive tail on the end of the shaft opposite to the end having the tap holder collet; a tap holder body rotatably mounted on the tap holder shaft and being adapted for releasable driving connection to a tool holder of a numerical-controlled machine, said tap holder body including a pair of opposed slots at one end of an internal thread at said end, a drive rate compensating assembly connecting the tap holder body and the tap holder shaft and allowing relative axial movement therebetween, said drive rate compensating assembly including a spring collar releasably mounted on said shaft, a set screw holding the spring collar on said shaft, a first coil spring having one end connected to the spring collar and the other end connected to the tap holder body, and a second coil spring having one end connected to the spring collar and the other end connected to the tap holder body, said first and second coil springs having substantially equal spring rates, whereby the springs allow axial displacement of the shaft relative to the body; and said tap holder body has a screw aperture contained therein, alignable with the set screw to provide a means of access for manipulating the set screw, and a limited drive torque assembly drivingly connecting the tap holder shaft to the tap holder body for turning the tap holder shaft at a torque under a selected maximum amount, said limited drive torque assembly includes a substantially flat body drive plate having a pair of ears extending into the slots of the body for driving rotation with the body, a substantially flat shaft drive plate having an aperture mateably receiving the drive tail of the tap holder shaft and being axially movable along the drive tail, a substantially flat brass washer positioned between the shaft drive plate and the body drive plate and frictionally engaging said shaft drive plate and the body drive plate to provide a frictional driving connection between the shaft drive plate and the body drive plate, a second brass washer frictionally engaging the body drive plate, a steel washer frictionally engaging the second brass washer, and an end cap threadedly mounted in the tube and engaging the steel washer to determine the normal force between the first brass washer and the body drive plate and the shaft drive plate to determine the maximum torque transmitted between the tap holder body and the tap holder shaft; and said drive rate compensating assembly including a spring collar releasably mounted on the tap holder shaft, a first coil spring having one end engaging the spring collar and the other end engaging the body, and a second coil spring opposed to the first spring, said second coil spring having one end engaging the spring collar and the other end engaging the body drive plate, said springs having equal spring rates, whereby the springs allow axial displacement of the tap holder shaft relative to the tap holder body.

* * * * *